Patented Dec. 8, 1953

2,662,099

UNITED STATES PATENT OFFICE 2,662,099

PREPARATION OF ACETALS

Wolfgang Ernst Thiele, Bergisch-Gladbach, Germany, assignor to Adolf Christian Joseph Opfermann, Bergisch-Gladbach, Germany No Drawing. Application February 21, 1951, Serial No. 212,202

Claims priority, application Netherlands March 1, 1950

8 Claims. (Cl. 260—611)

This invention relates to improvements in the preparation of acetals.

Acetals are generally prepared according to the conventional processes in two stages, using alcohols as the starting material. In these conventional processes the alcohols are oxidized to aldehydes in the first stage of the process and the aldehydes, after they have been isolated, are converted into acetals in the second stage of the process.

This conventional method is not adapted where aldehydes are formed, which easily decompose, undergo polymerization or condensation. The acetals of these unstable aldehydes are, however, almost always stable and have the further advantage of reacting like aldehydes in certain reactions without being necessary to first of all isolate the aldehyde itself.

One object of this invention is the production of acetals from alcohols in a single step without the aforementioned difficulties. This and further objects will become apparent from the following description and the examples.

According to the invention acetals are prepared in a single step by treating alcohols with an oxidizing agent in the presence of an ortho-ester and preferably in the presence of solvents.

It has been found particularly advantageous to use the ortho-esters of silica and formic acids. As oxidizing agents it has been found preferable to use chlorine, bromine, $N_2O_4$, $SeO_2$, $CrO_2Cl_2$, etc. It is also advantageous that these oxidizing agents be present in substantially stoichiometric quantity.

It is possible to carry out the oxidation of the alcohol in the presence of a solvent which is inert with reference to the reaction as, for instance, ether, benzol or decahydronapthalene. Instead of the inert solvent an excess of an ortho-ester may also be used. The reaction is preferably carried out at temperatures between —30 and 150° C. When proceeding in this manner it is possible to add dry hydrogen chloride to the reaction in case sufficient hydrogen chloride is not produced in the reaction itself. The hydrogen chloride catalyzes the acetalization by the ortho-ester present of the aldehyde formed. The acetals formed may be used as intermediates for organic syntheses; for aroma, taste or sweetness imparting substances and as solvents or softeners.

The following examples are given by way of illustration and not limitation, the invention being limited by the appended claims or their equivalents.

Example 1

Into 1 mol of iso-amyl alcohol which is mixed with a 10% excess of tetramethyl orthosilicate, there is dropped at 70–80° C. 160 grams of bromine, whereupon the mixture is kept at this temperature until the appearance of a light color.

Upon distillation there is obtained isovaleraldimethylacetal, B. P. 128–129° C. in a yield of 85% of the theoretical yield.

Example 2

Into 1 mol of 1-chlorobutanol-4, which has been dissolved in 300 grams tetramethyl orthosilicate, there are added, by dropping, 160 grams of bromine at 0° C. and the temperature is slowly increased to 60° C.; the appearance of a light color indicates the consumption of the bromine. Distillation gives $\gamma$-chlorobutyraldimethylacetal, B. $P_{.8}$ 88–91° C., in a yield of at least 55% of the theoretical yield.

Example 3

108 grams of benzyl alcohol and 300 grams of tetramethyl orthosilicate are mixed and brought to 70° C. Thereupon a very slow HCl current is introduced and at the same time 160 grams of bromine are added, by dropping, over the course of two hours, the temperature being maintained at 70° C. The loss of color of the bromine takes place almost immediately.

Purification by distillation gives 135.5 grams benzaldimethylacetal of a B. $P_{.11}$ of 73–79° C., i. e. 89.2% of the theoretical yield.

Example 4

45 grams of 1.4-butandiol and 300 grams of tetramethyl orthosilicate are mixed, and 160 grams of bromine are added, by dropping, over the course of 6 hours at 0° C. Thereupon, the temperature is maintained for 24 hours at 40–45° C. and then heated for another ½ hour at 65° C.

The purification of the almost colorless solution by distillation gives:

1. 31 grams succinindialdehyde tetramethylacetal (46% of the theoretical amount) of a B. $P_{.15}$ of 78–81° C., and 2. 17.1 grams monobromosuccindialdehyde tetramethylacetal (14% of the theoretical amount) of B. $P_{.17}$ 95–99° C.

I claim:

1. Method for the production of acetals which comprises contacting an alcohol with an oxidizing agent selected from the group consisting of chlorine, bromine, $N_2O_4$, $SeO_2$ and $CrO_2Cl_2$ at a temperature of about —30 to 150° C. in the presence of an ortho-ester and recovering acetal.

2. Method according to claim 1 in which said ortho-ester is tetramethyl orthosilicate.

3. Method according to claim 1 in which said ortho-ester is present in substantially stoichiometric quantities.

4. Method according to claim 1 in which said oxidizing agent is present in substantially stoichiometric quantities.

5. Method according to claim 1 in which said ortho-ester is present in amount in excess of the stoichiometric quantity.

6. Method according to claim 1 in which said contacting is effected in the presence of a solvent selected from the group consisting of ether, benzol, decahydronaphthaline.

7. Method according to claim 1 in which said contacting is effected at a temperature of about 0 to 80° C.

8. Method according to claim 1 in which said contacting is effected in the presence of dry hydrogen chloride.

WOLFGANG ERNST THIELE.

References Cited in the file of this patent

UNITED STATES PATENTS

| Number | Name | Date |
|---|---|---|
| 2,446,171 | Croxall et al. | Aug. 3, 1948 |
| 2,550,637 | Copenhaver | Apr. 24, 1951 |

OTHER REFERENCES

Richter: Organic Chemistry, vol. 1, page 190, (1921), Blakiston's Son and Co., Philadelphia, Pa.

Post: The Chemistry of Aliphatic Ortho Esters, pages 45–46, and 144, (1943), Reinhold Publishing Corp, New York, N. Y.